(12) United States Patent
Imamura et al.

(10) Patent No.: US 11,449,288 B2
(45) Date of Patent: Sep. 20, 2022

(54) INFORMATION PROCESSING APPARATUS, INFORMATION PROCESSING SYSTEM, AND INFORMATION PROCESSING METHOD

(71) Applicant: FUJIFILM Business Innovation Corp., Tokyo (JP)

(72) Inventors: Kenji Imamura, Kanagawa (JP);
Shinho Ikeda, Kanagawa (JP);
Masahiro Kobata, Kanagawa (JP);
Takanori Fukuoka, Kanagawa (JP);
Yuji Murata, Kanagawa (JP);
Kazuhiko Abe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 147 days.

(21) Appl. No.: 16/566,895

(22) Filed: Sep. 11, 2019

(65) Prior Publication Data
US 2020/0097230 A1     Mar. 26, 2020

(30) Foreign Application Priority Data

Sep. 21, 2018  (JP) .............................. JP2018-177109

(51) Int. Cl.
*G06F 3/12*        (2006.01)
*H04N 1/00*       (2006.01)

(52) U.S. Cl.
CPC .......... *G06F 3/1225* (2013.01); *G06F 3/1204* (2013.01); *H04N 1/00938* (2013.01); *H04N 1/00962* (2013.01)

(58) Field of Classification Search
CPC combination set(s) only.
See application file for complete search history.

(56) References Cited

U.S. PATENT DOCUMENTS

| 7,337,312 | B2 | 2/2008 | Fujinawa et al. | |
| 8,922,805 | B2* | 12/2014 | Utsumi | H04N 1/00904 |
| | | | | 358/1.13 |
| 2017/0255456 | A1* | 9/2017 | Igarashi | G06F 9/44505 |

FOREIGN PATENT DOCUMENTS

| JP | 2006202117 | 8/2006 |
| JP | 2014146098 | 8/2014 |

OTHER PUBLICATIONS

"Office Action of Japan Counterpart Application", dated Jul. 26, 2022, with English translation therof, p. 1-p. 5.

* cited by examiner

*Primary Examiner* — Helen Zong
(74) *Attorney, Agent, or Firm* — JCIPRNET (57) ABSTRACT

An information processing apparatus includes a first controller that performs control that does not depend on hardware; a second controller that is connected to the first controller through a communication path and performs control that depends on the hardware; and a memory in which first attribute information reflecting a first attribute of the first controller and second attribute information reflecting a second attribute of the second controller are stored. The first controller acquires a first control program for the first controller that is associated with a combination of the first attribute information and the second attribute information and performs control on a basis of the first control program, and the second controller acquires a second control program for the second controller that is associated with a combination of the first attribute information and the second attribute information and performs control on a basis of the second control program.

10 Claims, 4 Drawing Sheets

| ID(0) | ID(1) | Attributes of System Controller ||||| Attributes of Device Controller ||||
|---|---|---|---|---|---|---|---|---|---|
| | | SYSTEM TYPE | SYSTEM ID | DESTINATION | DEVELOPMENT GENERATION | DEVICE TYPE | DEVICE ID | DESTINATION | DEVELOPMENT GENERATION | SPEED |
| 0070 | 00000 | MFP | 07 | JAPAN | FIRST | MFP | 00 | JAPAN | FIRST | LOW |
| 0070 | 00001 | MFP | 07 | JAPAN | FIRST | MFP | 00 | JAPAN | FIRST | MEDIUM |
| 0070 | 00002 | MFP | 07 | JAPAN | FIRST | MFP | 00 | JAPAN | FIRST | HIGH |
| 0074 | 00040 | MFP | 07 | NORTH AMERICA | FIRST | MFP | 00 | NORTH AMERICA | FIRST | LOW |
| 0078 | 00040 | MFP | 07 | ASIA | FIRST | SFP | 00 | NORTH AMERICA | FIRST | LOW |
| 1071 | 10111 | SFP | 07 | JAPAN | SECOND | MFP | 01 | JAPAN | SECOND | MEDIUM |
| 0071 | 00211 | MFP | 07 | JAPAN | SECOND | MFP | 02 | JAPAN | SECOND | MEDIUM |
| ... | ... | ... | ... | ... | ... | ... | ... | ... | ... | ... |

FIG. 3

| ID(0) | ID(1) | PRESENCE OF SYSTEM FW | FW VERSION | PRESENCE OF DEVICE FW | FW VERSION |
|---|---|---|---|---|---|
| 0000 | 00000 | 1 | 00_0 | 1 | 00_0 |
| 0000 | 00001 | 1 | 00_0 | 1 | 00_1 |
| 0000 | 00002 | 1 | 00_0 | 1 | 00_2 |
| 0000 | 00003 | 0 | — | 0 | — |
| 0001 | 00000 | 1 | 00_1 | 1 | 00_0 |
| 0001 | 00001 | 1 | 00_1 | 1 | 00_1 |
| 0001 | 00002 | 1 | 00_1 | 1 | 00_2 |
| 0001 | 00003 | 0 | — | 0 | — |
| 0002 | 00000 | 0 | — | 0 | — |
| 0002 | 00001 | 0 | — | 0 | — |
| 0002 | 00002 | 0 | — | 0 | — |
| 0002 | 00003 | 0 | — | 0 | — |
| ... | ... | ... | ... | ... | ... |

FIG. 4

INFORMATION PROCESSING APPARATUS, INFORMATION PROCESSING SYSTEM, AND INFORMATION PROCESSING METHOD

CROSS-REFERENCE TO RELATED APPLICATIONS

This application is based on and claims priority under 35 USC 119 from Japanese Patent Application No. 2018-177109 filed Sep. 21, 2018.

BACKGROUND

(i) Technical Field

The present disclosure relates to an information processing apparatus, an information processing system, and an information processing method.

(ii) Related Art

In an information processing apparatus such as an image forming apparatus, a versatile first controller that does not depend on hardware included in the information processing apparatus and a dedicated second controller that depends on the hardware included in the information processing apparatus are sometimes provided so that the first controller and the second controller play different roles of a controller.

Japanese Unexamined Patent Application Publication No. 2006-202117 describes an apparatus that, when receiving firmware from an outside, determines whether or not the firmware is compatible with the apparatus on the basis of apparatus unique information such as a model name and downloads the firmware from the outside in a case where the firmware is compatible with the apparatus.

SUMMARY

A first controller sometimes acquires a control program for the first controller by using unchangeable identification information unique to an information processing apparatus in which the first controller is mounted and performs control by using the control program for the first controller. However, a situation where the unique identification information cannot cope with update, change, and the like of the control program can occur. For example, such a situation can occur in which in a case where a new control program is created and where identification information different from identification information unique to an information processing apparatus is associated with the new control program, the new control program cannot be acquired by using the unique identification information.

Aspects of non-limiting embodiments of the present disclosure relate to providing an information processing apparatus including a first controller that performs control that does not depend on hardware and a second controller that performs control that depends on the hardware, in which restriction on acquisition of a control program for the first controller and a control program for the second controller is mitigated as compared with a case where the control program for the first controller and the control program for the second controller are acquired by using identification information unique to the information processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a first controller that performs control that does not depend on hardware; a second controller that is connected to the first controller through a communication path and performs control that depends on the hardware; and a memory in which first attribute information reflecting a first attribute of the first controller and second attribute information reflecting a second attribute of the second controller are stored. The first controller acquires a first control program for the first controller that is associated with a combination of the first attribute information and the second attribute information and performs control on a basis of the first control program, and the second controller acquires a second control program for the second controller that is associated with a combination of the first attribute information and the second attribute information and performs control on a basis of the second control program.

BRIEF DESCRIPTION OF THE DRAWINGS

An exemplary embodiment of the present disclosure will be described in detail based on the following figures, wherein.

DETAILED DESCRIPTION

Figure 1:
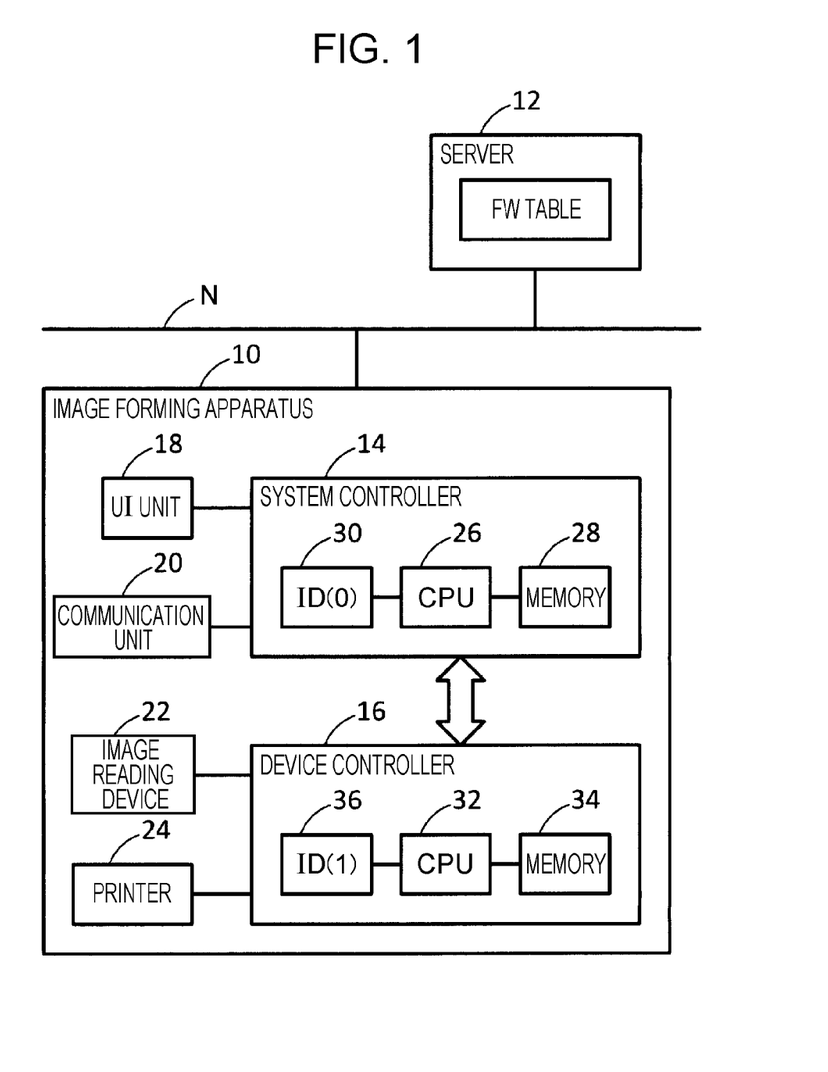
FIG. 1 is a block diagram illustrating an information processing system according to an exemplary embodiment of the present disclosure.

An information processing system according to the present exemplary embodiment is described with reference to FIG. 1. FIG. 1 illustrates an example of the information processing system according to the present exemplary embodiment. The information processing system according to the present exemplary embodiment includes an image forming apparatus 10 that is an example of an information processing apparatus and a server 12. The image forming apparatus 10 and the server 12 communicate with each other through a communication path N such as the Internet or a network of other kinds. Plural image forming apparatuses 10 and plural servers 12 may be included in the information processing system. The information processing apparatus according to the present exemplary embodiment is not limited to the image forming apparatus 10 and may be, for example, any of appliances in general such as information appliances, video appliances, audio appliances, and other kinds of appliances. In the following description, the image forming apparatus 10 is used as an example of the information processing apparatus.

The image forming apparatus 10 is an apparatus that has an image forming function. Specifically, the image forming apparatus 10 is an apparatus that has at least one of an image reading function, a print function, a copy function, and a facsimile function.

The server 12 is an apparatus which stores therein firmware that is an example of a control program for controlling the image forming apparatus 10 and supplies the firmware to the image forming apparatus 10. For example, a firmware table (hereinafter referred to as a "FW table") for managing firmware is stored in the server 12. The FW table is an example of management information. The image forming apparatus 10 acquires the firmware from the server 12, and thus a configuration (execution environment) functioning as the image forming apparatus 10 is dynamically constructed. The FW table will be described in detail later. The server 12 includes, for example, a communication unit functioning as a communication interface, a storage unit constituted by a hard disk drive, a memory, and the like, and a controller constituted by a processor and the like.

A configuration of the image forming apparatus 10 is described in detail below.

The image forming apparatus 10 includes one or more pieces of hardware having a function, a system controller 14, and a device controller 16. The system controller 14 is an example of a first controller, and the device controller 16 is an example of a second controller.

The system controller 14 and the device controller 16 are connected to each other through a communication path such as a bus (e.g., a high-speed bus such as PCI Express) and transmit and receive various kinds of information to and from each other. For example, information such as command information indicative of a command to execute processing, status information indicative of statuses of the controllers, and information indicative of a detection result of a sensor or the like may be exchanged between the system controller 14 and the device controller 16. A format of the information exchanged between the system controller 14 and the device controller 16 may be a format selected from among predetermined plural formats. Furthermore, the system controller 14 and the device controller 16 may be connected to each other through a dedicated line and exchange information such as information for synchronizing the system controller 14 and the device controller 16.

The image forming apparatus 10 includes, as examples of the hardware, a UI unit 18, a communication unit 20, an image reading device 22, and a printer 24.

The UI unit 18 is a user interface and includes a display unit and an operation unit. The display unit is, for example, a display device such as a liquid crystal display or an EL display. The operation unit is, for example, an input device such as a keyboard. The UI unit 18 may be a user interface (e.g., a touch panel or an operation panel) that functions as both a display unit and an operation unit.

The communication unit 20 is a communication interface and has a function of transmitting information to another apparatus through the communication path N and a function of receiving information transmitted from another apparatus. The communication may be wireless communication or may be wired communication.

The image reading device 22 is, for example, a scanner and is a device that generates image data representing a document by reading the document.

The printer 24 is, for example, a printer and is a device that receives image data, document data, and the like and forms an image, a document, and the like on a recording medium such as a sheet of paper.

In addition, the image forming apparatus 10 may include a fan for cooling an inside of the image forming apparatus 10, a storage device such as a hard disk and a memory, and the like. In the storage device, for example, various kinds of data (e.g., image data generated by scan and image data to be printed) and various kinds of programs are stored. Needless to say, other kinds of hardware may be included in the image forming apparatus 10.

The system controller 14 includes a central processing unit (CPU) 26 that is an example of a processor and a memory (e.g., a ROM) that is an example of a storage device. As described later, firmware (e.g., a ROM image) for constructing the system controller 14 is downloaded from the server 12 to the system controller 14, and the firmware is stored in the memory 28. The CPU 26 executes the firmware, and thus functions of the system controller 14 are realized. That is, before the firmware is downloaded, the system controller 14 is not constructed as a complete body for realizing functions of the system controller 14 and is mounted in the image forming apparatus 10 as an incomplete body. By downloading the firmware into the memory 28, a complete body functioning as the system controller 14 is constructed. Hereinafter, a system controller into which firmware has been downloaded and that is in a functioning state is referred to as a "system controller as a complete body". Firmware for constructing the system controller 14 as a complete body is an example of a first control program.

The system controller 14 as a complete body has a function of performing processing that does not depend on hardware included in the image forming apparatus 10, i.e., a function of controlling a common part that does not depend on a type of each hardware part, an individual difference of each hardware part, a difference between products, and the like. For example, the system controller 14 as a complete body performs processing such as display and input processing on the UI unit 18 serving as hardware, communication (e.g., communication with an external device through the communication path N) using the communication unit 20, processing of image data and appliance information, image processing, user authentication processing, and a management of a memory (e.g., reading of an SD card).

Furthermore, an ID(0) 30 for identifying the system controller 14 is stored in the system controller 14. For example, the ID(0) 30 is stored in the memory 28. The ID(0) 30 is information corresponding to an example of first attribute information and is information reflecting an attribute (corresponding to an example of a first attribute) of the system controller 14. The ID(0) 30 is information changed in accordance with an attribute of the system controller 14. The ID(0) 30 is set for each system controller 14 and is associated with the system controller 14. An attribute of the system controller 14 is specified on the basis of the ID(0) 30. The ID(0) 30 is used to download firmware from the server 12. For example, the system controller 14 specifies an attribute of the system controller 14 on the basis of the ID(0) 30 and acquires firmware corresponding to the attribute from the server 12.

For example, the CPU 26 of the system controller 14 as a complete body sends command information (e.g., a job such as a print job or a copy job) indicative of a command to execute processing to the device controller 16. The execution command is an execution command having a format that does not depend on hardware and is, for example, a command written in a language that can be understood by a user. The command information is stored in the device controller 16.

The device controller 16 includes a CPU 32 that is an example of a processor and a memory 34 (e.g., a ROM) that is an example of a storage device. As described later, firmware (e.g., a ROM image) for constructing the device controller 16 is downloaded from the server 12 to the device controller 16, and the firmware is stored in the memory 34.

The CPU 32 executes the firmware, and thus functions of the device controller 16 are realized. That is, before the firmware is downloaded, the device controller 16 is not constructed as a complete body for realizing functions of the device controller 16 and is mounted in the image forming apparatus 10 as an incomplete body. By downloading the firmware into the memory 34, a complete body functioning as the device controller 16 is constructed. Hereinafter, a device controller in which firmware has been downloaded and that is in a functioning state is referred to as a "device controller as a complete body". Firmware for constructing the device controller 16 as a complete body is an example of a second control program.

The device controller 16 as a complete body has a function of performing processing that depends on hardware included in the image forming apparatus 10, i.e., a function of controlling a part unique to the hardware. For example, the device controller 16 as a complete body performs processing such as control of the image reading device 22, control of the printer 24, control of a fan, control of a post-processing device such as a stapler, and control of a motor, a heater, a lamp, and the like based on information obtained, for example, by various kinds of sensors.

Furthermore, an ID(1) 36 for identifying the device controller 16 is stored in the device controller 16. For example, the ID(1) 36 is stored in the memory 34. The ID(1) 36 is information that is an example of second attribute information and is information reflecting an attribute (corresponding to an example of a second attribute) of the device controller 16. That is, the ID(1) 36 is information changed in accordance with an attribute of the device controller 16. The ID(1) 36 is set for each device controller 16 and is associated with the device controller 16. An attribute of the device controller 16 is specified on the basis of the ID(1) 36. The ID(1) 36 is used to download firmware from the server 12. For example, the device controller 16 specifies an attribute of the device controller 16 on the basis of the ID(1) 36 and acquires firmware corresponding to the attribute from the server 12.

For example, the CPU 32 of the device controller 16 as a complete body executes processing designated by an execution command indicated by command information sent from the system controller 14. For example, in a case where execution of copy is designated by the execution command, the CPU 32 causes the image reading device 22 and the printer 24 to execute copy by controlling the image reading device 22 and the printer 24 in accordance with copy conditions (e.g., resolution, a sheet size, and the number of copies) designated by the command information.

As described above, not all pieces of firmware needed to control the image forming apparatus 10 are mounted in the system controller 14 and the device controller 16. For example, firmware for constructing the system controller 14 and the device controller 16 as complete bodies and causing the system controller 14 and the device controller 16 to control the image forming apparatus 10 is stored in the server 12. A control program (hereinafter referred to as a download program) for downloading the firmware from the server 12 into the image forming apparatus 10 is stored in advance in the system controller 14. In a case where the image forming apparatus 10 is powered on for the first time, the system controller 14 downloads firmware for the system controller 14 from the server 12 into the system controller 14 by executing the download program and downloads firmware for the device controller 16 from the server 12 into the device controller 16. In this way, the system controller 14 and the device controller 16 are constructed as complete bodies. Note that the system controller 14 may download the firmware for the system controller 14, and the device controller 16 may download the firmware for the device controller 16.

The ID(0) 30 and the ID(1) 36 are used for download of firmware. For example, a combination of the ID(0) 30 and the ID(1) 36 and the firmware are associated in the FW table stored in the server 12. The ID(0) 30 reflects an attribute of the system controller 14, and the ID(1) 36 reflects an attribute of the device controller 16. In the FW table, firmware for realizing a combination of an attribute of the system controller 14 and an attribute of the device controller 16 is registered. Hereinafter, the combination of the ID(0) 30 and the ID(1) 36 is referred to as an "own ID".

Since the system controller 14 and the device controller 16 have different roles, there sometimes arises a difference in development cycle between the system controller 14 and the device controller 16. In order to address this difference, a control device may be divided into the system controller 14 and the device controller 16, and each controller may be given a role.

The information processing system according to the present exemplary embodiment is described in more detail below.

Figure 2:
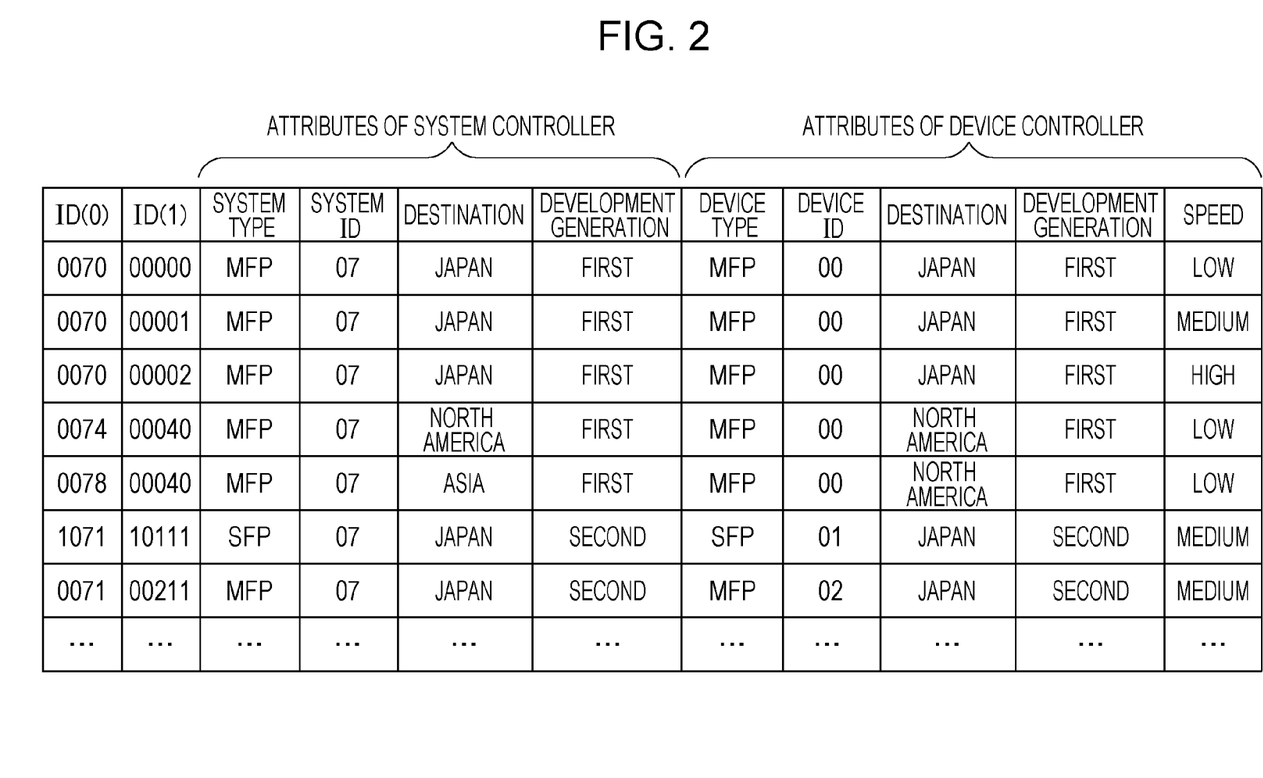
FIG. 2 illustrates an ID of a system controller and an ID of a device controller.

The ID(0) 30 of the system controller 14 and the ID(1) 36 of the device controller 16 are described in detail with reference to FIG. 2. FIG. 2 illustrates an example of an ID.

A setting value in the table illustrated in FIG. 2 is expressed as a hexadecimal number. The ID(0) 30 is decided by an attribute of the system controller 14. The ID(1) 36 is decided by an attribute of the device controller 16.

Examples of the attribute of the system controller 14 include a type of system controller 14, a system ID, a destination of the image forming apparatus 10 in which the system controller 14 is mounted (e.g., a country, a regional area, or the like in which the image forming apparatus 10 will be used), a development generation of the system controller 14, and functions of the system controller 14 (functions given to the system controller 14), and these attributes are reflected in the ID(0) 30. That is, the ID(0) 30 is created on the basis of these attributes.

Examples of the attribute of the device controller 16 include a type of device controller 16, a device ID, a destination of the image forming apparatus 10 in which the device controller 16 is mounted, a development generation of the device controller 16, functions of the device controller 16, and performance of the image forming apparatus 10 in which the device controller 16 is mounted, and these attributes are reflected in the ID(1) 36. That is, the ID(1) 36 is created on the basis of these attributes.

The type of system controller 14 and the type of device controller 16 correspond to a type of image forming function. The type is, for example, a multi function printer (MFP), a single function printer (SFP), or the like. The MFP is, for example, an image forming apparatus (a multifunction printer) having not only a print function, but also a copy function, an image reading function, a facsimile function, and the like as image forming functions. The SFP is, for example, an apparatus that has only a print function as an image forming function. The system controller 14 having the ID(0) 30 with which an MFP is associated is a controller used for an MFP and is a controller into which firmware for realizing an MFP is assumed to be downloaded. The system controller 14 having the ID(0) 30 with which an SFP is associated is a controller used for an SFP and is a controller into which firmware for realizing an SFP is assumed to be downloaded. The same applies to the device controller 16.

The system ID is an ID associated with the system controller 14. The device ID is an ID associated with the device controller 16.

The destination is, for example, a country, a regional area, or the like such as Japan, North America, or Asia. The image forming apparatus 10 is shipped to the destination.

For example, the image forming apparatus 10 in which a controller for which the destination is set to "Japan" is shipped to somewhere in Japan.

The "speed" set as an attribute of the device controller 16 is, for example, a speed of an image forming function (e.g., a print function). For example, a low speed, a medium speed, or a high speed is set as the speed.

The attributes illustrated in FIG. 2 are merely an example, and other attributes may be set. Furthermore, the attributes may be changed in the future and the number of attributes may be increased or decreased.

The ID(0) 30 and the ID(1) 36 are defined on the basis of attributes as follows:

ID(0)={system type (3:0), system ID (7:0), destination (1:0), development generation (1:0)}

ID(1)={device type (3:0), device ID (7:0), destination (1:0), development generation (1:0), speed (1:0), Rsv (1:0)}

Note that Rsv (1:0) is a preliminary attribute, and Rsv (1:0) is used when a new attribute is added in the future.

Values of the attributes are set as follows;

type=MFP: 0x0, SFP: 0x1, . . . .

destination=Japan: 00(2), North America: 01(2), Asia: 10(2), others: 11(2)

development generation=first generation: 00(2), second generation: 01(2), third generation: 10(2), fourth generation: 11(2)

speed=low speed: 00(2), medium speed: 01(2), high speed: 10(2), others: 11(2)

For example, before the system controller 14 as an incomplete body is incorporated into the image forming apparatus 10, the ID(0) 30 is created on the basis of attributes of the system controller 14 in accordance with the above definitions, and the ID(0) 30 is stored in the system controller 14.

Similarly, for example, before the device controller 16 as an incomplete body is incorporated into the image forming apparatus 10, the ID(1) 36 is created on the basis of attributes of the device controller 16 in accordance with the above definitions, and the ID(1) 36 is stored in the device controller 16.

Figure 3:
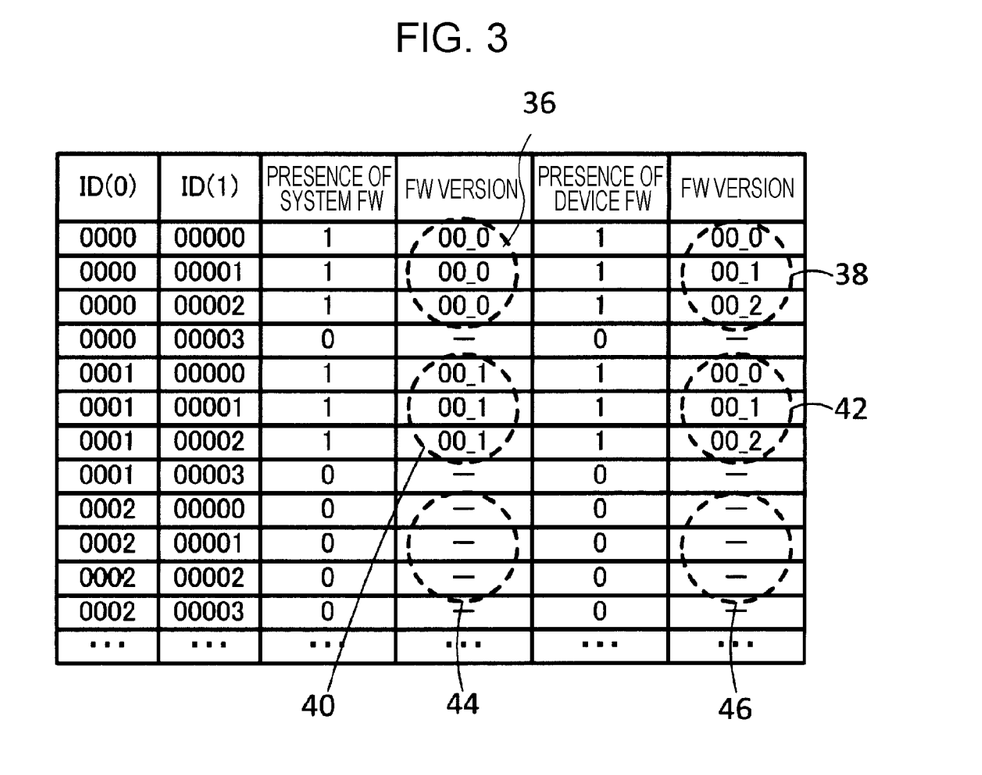
FIG. 3 illustrates a FW table (firmware table)

The FW table stored in the server 12 is described in detail with reference to FIG. 3. FIG. 3 illustrates an example of the FW table.

In the FW table, an own ID, information indicative of the presence or absence of firmware for the system controller 14, information indicative of a version of the firmware for the system controller 14, information indicative of the presence or absence of firmware for the device controller 16, and information indicative of a version of the firmware for the device controller 16 are associated with one another.

The ID(0) 30 and the ID(1) 36 are values decided on the basis of the attributes in accordance with the above definition.

In a case where firmware for the system controller 14 corresponding to the own ID is stored in the server 12, information (value) indicative of the presence or absence of the firmware for the system controller 14 is set to "1". In a case where the firmware is not stored in the server 12, the value is set to "0".

Similarly, in a case where firmware for the device controller 16 corresponding to the own ID is stored in the server 12, information (value) indicative of the presence or absence of the firmware for the device controller 16 is set to "1". In a case where the firmware is not stored in the server 12, the value is set to "0".

Note that firmware may be stored in a storage device other than the server 12 and downloaded from the storage device into the image forming apparatus 10. In this case, in a case where the firmware is stored in the storage device, the value is set to "1", and in a case where the firmware is not stored in the storage device, the value is set to "0".

For example, in a case where firmware corresponding to the combination of IDs has been developed already, the firmware is present and therefore the value is set to "1". In a case where the firmware has not been developed yet, the firmware is not present and therefore the value is set to "0".

For example, in a case where new firmware is developed or in a case where new firmware is scheduled to be developed, the FW table is updated.

For example, in a case where the ID(0) 30 is "0000" and the ID(1) 36 is "00000", "00001", or "00002" as indicated by the reference sign "36", only one kind of firmware for the system controller 14 is present. Furthermore, firmware for the device controller 16 is present for each of three kinds of speeds as indicated by the reference sign "38".

In a case where the ID(0) 30 is "0001" and the ID(1) 36 is "00000", "00001", or "00002" as indicated by the reference sign "40", only one kind of firmware for the system controller 14 is present. Furthermore, firmware for the device controller 16 is present for each of three kinds of speeds as indicated by the reference sign "42". Even in a case where the generation of the system controller 14 is changed to the second generation, the firmware for the device controller 16 is not changed.

In a case where the ID(0) 30 is "0002" and the ID(1) 36 is "00000", "00001", or "00002" as indicated by the reference sign "44", firmware for the system controller 14 is not present. Furthermore, firmware for the device controller 16 is not present as indicated by the reference sign 46.

The FW table may be updated, for example, every time the system controller 14 or the device controller 16 having a new attribute is created. For example, in a case where the system controller 14 having a new attribute is created and firmware corresponding to the new attribute is created, a combination of an ID indicative of the new attribute and the firmware is registered in the FW table. The same applies to the device controller 16. The new ID and the firmware are registered, for example, by a system administrator, a developer, or the like. In this way, firmware corresponding to the new attribute is registered in the FW table. For example, there is a possibility that firmware corresponding to a latest attribute has been registered in the FW table and the firmware is downloaded from the latest FW table into the image forming apparatus 10 during use of the image forming apparatus 10.

Furthermore, new firmware for the existing system controller 14 or device controller 16 may be created. In this case, the new firmware is registered in the FW table in association with an ID indicative of an existing attribute. The system controller 14 and the device controller 16 acquire the new firmware, and thus the functions of the system controller 14 and the device controller 16 are updated. For example, even in a case where the own ID remains the same, firmware is sometimes updated. The image forming apparatus 10 may download new firmware from the server 12, for example, regularly, at a time of repair, or at any timing.

Since firmware for the system controller 14 and firmware for the device controller 16 have a correlation, the firmware for the system controller 14 and the firmware for the device controller 16 are associated with the own ID. That is, functions (contents of the firmware for the device controller 16) allocated to the device controller 16 are sometimes changed depending on functions (contents of the firmware for the system controller 14) allocated to the system controller 14, and vice versa. Accordingly, the firmware for the system controller 14 and the firmware for the device controller 16 are associated with the own ID.

In a case where there is no firmware corresponding to an attribute or in a case where use of a combination of an attribute of the system controller 14 and an attribute of the device controller 16 is prohibited, a flag indicative of absence of firmware is set in the FW table.

Figure 4:
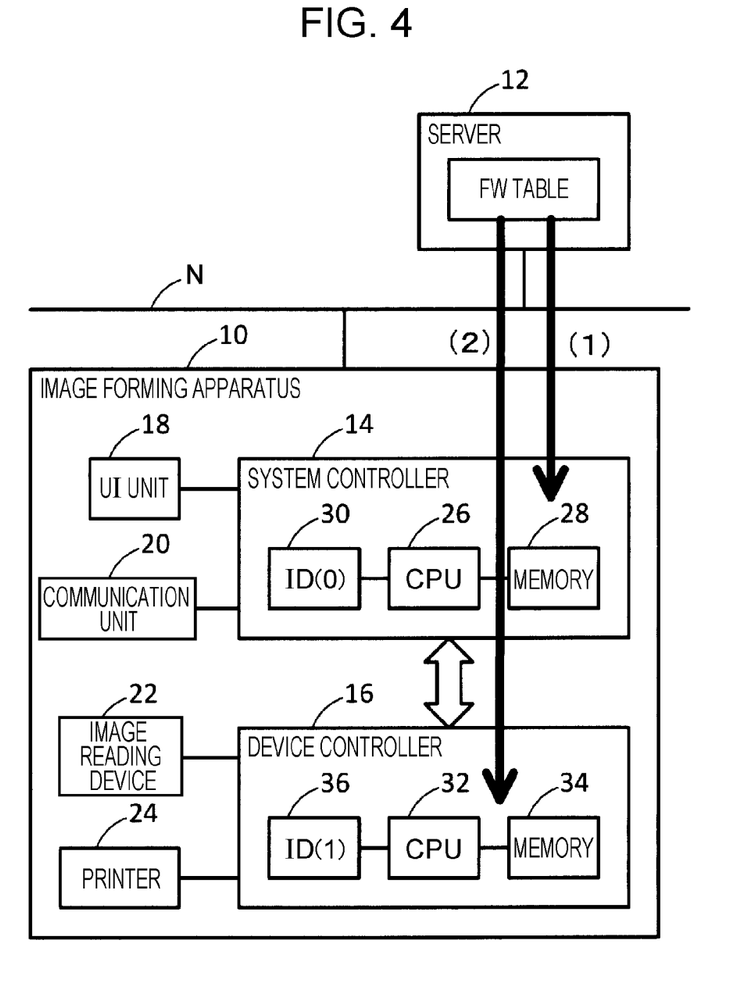
FIG. 4 is a block diagram illustrating an information processing system according to the present exemplary embodiment.

Operation of the image forming apparatus 10 according to the present exemplary embodiment is described with reference to FIG. 4. FIG. 4 illustrates a configuration of the information processing system according to the present exemplary embodiment.

In a case where the image forming apparatus 10 is powered on for the first time (e.g., in a case where the image forming apparatus 10 is powered on for the first time after being shipped from a factory), the CPU 26 of the system controller 14 executes a program for downloading firmware. The system controller 14 thus generates an own ID by combining the ID(0) 30 stored in the system controller 14 and the ID(1) 36 stored in the device controller 16.

Next, the system controller 14 specifies firmware for the system controller 14 associated with the own ID in the FW table stored in the server 12, downloads the firmware (ROM image) from the server 12 into the system controller 14, and stores the firmware (ROM image) into the memory 28 (ROM) (1).

Next, the system controller 14 specifies firmware for the device controller 16 associated with the own ID in the FW table stored in the server 12, downloads the firmware (ROM image) from the server 12 into the device controller 16, and stores the firmware (ROM image) into the memory 34 (ROM) (2). The firmware for the device controller 16 may be downloaded by the device controller 16. In this case, a program for downloading firmware is stored in the device controller 16, and the firmware is downloaded into the memory 34 by CPU 32's execution of the program.

When the download of the firmware is completed, the system controller 14 and the device controller 16 are rebooted. After the reboot, the system controller 14 operates based on the firmware stored in the memory 28, and the device controller 16 operates based on the firmware stored in the memory 34. In this way, the system controller 14 and the device controller 16 as complete bodies are constructed.

In the present exemplary embodiment, the firmware of the system controller 14 and the firmware of the device controller 16 are acquired by using the own ID.

The own ID according to the present exemplary embodiment is information reflecting the attributes of the system controller 14 and the device controller 16 and information that can be changed by these attributes. By associating, with firmware to be acquired, attributes of the system controller 14 and the device controller 16 for which the firmware is to be used, firmware for the system controller 14 and firmware for the device controller 16 mounted in the image forming apparatus 10 are acquired even in a case where the system controller 14 and the device controller 16 are changed in the image forming apparatus 10 or in a case where new firmware is created.

By downloading firmware into the image forming apparatus 10, the system controller 14 and the device controller 16 as complete bodies are constructed.

One or more of functions of firmware may be restricted in accordance with an attribute. For example, in a case where use of Wi-Fi (Registered Trademark) is permitted in Japan and North America but is not permitted in Asia, firmware whose Wi-Fi function is restricted is prepared as firmware for Asia. Furthermore, in a case where use of Wi-Fi is not permitted only in a specific country of Asia, a country number may be added to an ID, and the Wi-Fi function may be restricted as for firmware associated with the ID.

In the present exemplary embodiment, an attribute of the system controller 14 and an attribute of the device controller 16 mounted in the image forming apparatus 10 may be identical to each other or may be different from each other. That is, there may be a difference between an attribute of the system controller 14 and an attribute of the device controller 16 or there may be no difference between an attribute of the system controller 14 and an attribute of the device controller 16.

For example, in a case where the system controller 14 mounted in the image forming apparatus 10 corresponds to an MFP and the device controller 16 mounted in the image forming apparatus 10 corresponds to an MFP, the attribute of the system controller 14 and the attribute of the device controller 16 concerning the type are identical to each other. In this case, firmware corresponding to an MFP is downloaded into the system controller 14 and the device controller 16. The image forming apparatus 10 thus operates as an MFP. The FW table is created so that such download is realized. For example, firmware for an MFP is associated with an attribute combination in which the type of the system controller 14 is an MFP and the type of the device controller 16 is an MFP, and the firmware is downloaded.

Meanwhile, in a case where the system controller 14 corresponds not to an MFP but to an SFP and the device controller 16 corresponds to an MFP, the attribute of the system controller 14 and the attribute of the device controller 16 concerning the type are different from each other. In this case, firmware for an inferior function is downloaded. Specifically, firmware corresponding to an SFP is downloaded into the system controller 14, and not firmware corresponding to an MFP but firmware corresponding to an SFP is downloaded into the device controller 16. The image forming apparatus 10 thus functions as an SFP. That is, firmware for an SFP that is firmware whose function is restricted in accordance with the difference between the attribute of the system controller 14 and the attribute of the device controller 16 is downloaded. The FW table is created so that such download is realized. For example, firmware for an SFP is associated with an attribute combination in which the type of the system controller 14 is an SFP and the type of the device controller 16 is an MFP, and the firmware is downloaded. That is, in the FW table, not firmware for an MFP but firmware whose function is restricted to an SFP that is the type of system controller 14 is associated with the device controller 16.

In a case where the device controller 16 is a controller for an MFP but the system controller 14 does not correspond to an MFP and is a controller for an SFP, the image forming apparatus 10 does not operate as an MFP since the system controller 14 does not have a function for control for realizing an MFP even in a case where firmware corresponding to an MFP is downloaded into the device controller 16. That is, since the system controller 14 does not have a function of giving a control signal concerning a function which an SFP does not have but an MFP has to the device controller 16, the image forming apparatus 10 does not operate as an MFP. Even in a case where firmware for an MFP is downloaded into the device controller 16, the firmware is not useful, and therefore firmware for an SFP is downloaded into the device controller 16. As described above, an attribute of the system controller 14 and an attribute of the device controller 16 have a correlation, and therefore firmware for realizing the attribute of the system controller 14 and the attribute of the device controller 16 is associated with the own ID in consideration of the correlation. In this way, in a case where the system controller 14 for an SFP and the device controller 16 for an MFP are mounted in the same image forming apparatus 10, firmware for an SFP is downloaded into the image forming apparatus 10.

For example, firmware for an SFP whose scan function is restricted is associated with the own ID, and the firmware is downloaded.

Similarly, in a case where the system controller 14 corresponds to an MFP and the device controller 16 corresponds not to an MFP but to an SFP contrary to the above example, firmware for an SFP is associated with the own ID, and the firmware is downloaded.

As in the case where the type of the system controller 14 and the type of the device controller 16 are different, in a case where a development generation of the system controller 14 and a development generation of the device controller 16 mounted in the image forming apparatus 10 are different, firmware whose function is restricted is downloaded. For example, in a case where the system controller 14 of an old generation and the device controller 16 of a new generation are mounted in the image forming apparatus 10, firmware for realizing functions corresponding to the old generation only is downloaded into the system controller 14 and the device controller 16. In the FW table, firmware for realizing functions that correspond to the old generation only is associated with a combination of the old generation and the new generation so that such download is realized.

For example, in a case where the system controller 14 is a controller of a first generation and where the device controller 16 is a controller of a second generation, not firmware for realizing a new function of the second generation but firmware for realizing only a function of the first generation is associated with a combination of these attributes. In this way, in a case where the system controller 14 of the first generation and the device controller 16 of the second generation are mounted in the same image forming apparatus 10, firmware for the first generation is downloaded into the image forming apparatus 10.

Although in a case where an attribute of the system controller 14 and an attribute of the device controller 16 are different from each other, firmware restricting a function of one of the controllers is downloaded in the above example, firmware for updating a function of the other controller may be downloaded.

A modification is described below.

For example, a situation where an attribute of the system controller 14 and an attribute of the device controller 16 become different from each other sometimes occur because the system controller 14 is replaced with a system controller 14 as a complete body that has a different attribute or the device controller 16 is replaced with a device controller 16 as a complete body that has a different attribute after the system controller 14 and the device controller 16 as complete bodies are constructed. Furthermore, situations such as a situation where each controller cannot control the other controller and a situation where a control signal cannot be exchanged between controllers can occur.

The system controller 14 and the device controller 16 may check whether or not the above situations are occurring, for example, after activation of firmware. For example, the CPU 26 of the system controller 14 activates firmware for the system controller 14 stored in the memory 28. Similarly, the CPU 32 of the device controller 16 activates firmware for the device controller 16 stored in the memory 34. The CPU 26 and the CPU 32 exchange information indicative of attributes or the like of each other's firmware and determines whether or not the each other's attributes are identical, whether or not firmware of the partner can be controlled by firmware thereof, whether or not exchange of a control signal with the firmware thereof is possible on the basis of information received from the partner. For example, in a case where the attributes of the firmware of the system controller 14 and the attributes of the firmware of the device controller 16 are identical, for example, it is determined that the firmware can be controlled by the firmware of the other controller and it is determined that a control signal can be exchanged. In a case where the attributes of the firmware of the system controller 14 and the firmware of the device controller 16 are different, for example, it is determined that the firmware cannot be controlled by the firmware of the other controller and it is determined that a control signal cannot be exchanged.

In a case where the above situations are occurring between the system controller 14 and the device controller 16 after the replacement, the system controller 14 downloads firmware associated with the own ID in the FW table. For example, in a case where a development generation of the system controller 14 and a development generation of the device controller 16 are different, firmware in which a function of one of the controllers is restricted is downloaded. After the download, the system controller 14 and the device controller 16 are rebooted, and the system controller 14 and the device controller 16 as complete bodies are constructed, as in the above exemplary embodiment.

In a case where the above situations are not occurring between the system controller 14 and the device controller 16 after the replacement, no firmware is downloaded, and the image forming apparatus 10 is controlled by firmware that has been already stored in the system controller 14 and the device controller 16.

For example, in a case where the system controller 14 and the device controller 16 of the same generation are mounted in the image forming apparatus 10 but the system controller 14 is replaced with a system controller 14 of a next generation, the above situations occur between the new system controller 14 and the device controller 16. In this case, the system controller 14 generates an own ID that is a combination of a changed ID(0) 30 and the ID(1) 36 of the device controller 16 and searches for firmware associated with the own ID in the FW table. For example, in a case where, out of the firmware for the system controller 14 and the firmware for the device controller 16 that correspond to the own ID, only firmware for the system controller 14 is updated to new firmware, the system controller 14 downloads only the firmware for the system controller 14 from the server 12.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a first controller that performs control that does not depend on hardware;
a second controller that is connected to the first controller through a communication path and performs control that depends on the hardware; and
a memory in which first attribute information reflecting a first attribute of the first controller and second attribute information reflecting a second attribute of the second controller are stored,
wherein the first controller acquires a first control program for the first controller that is associated with a combination of the first attribute information and the second attribute information and performs control on a basis of the first control program, and
wherein the second controller acquires a second control program for the second controller that is associated with a combination of the first attribute information and the second attribute information and performs control on a basis of the second control program, wherein
the first controller specifies the first attribute on a basis of the first attribute information;
the second controller specifies the second attribute on a basis of the second attribute information;
the first controller acquires the first control program associated with a combination of the first attribute and the second attribute; and
the second controller acquires the second control program associated with the combination of the first attribute and the second attribute.

2. The information processing apparatus according to claim 1, wherein
the first attribute information is changed in accordance with the first attribute; and
the second attribute information is changed in accordance with the second attribute.

3. The information processing apparatus according to claim 2, wherein
the first controller and the second controller acquire the first control program and the second control program, respectively by referring to management information in which the combination of the first attribute information and the second attribute information and a combination of the first control program and the second control program are associated with each other; and
the management information is updated when a first control program corresponding to a new first attribute of the first controller and a second control program corresponding to a new second attribute of the second controller are registered in the management information.

4. The information processing apparatus according to claim 3, wherein
in a case where the first attribute and the second attribute are different, the first controller or the second controller acquires a control program whose function is restricted as a control program for the first controller or the second controller.

5. The information processing apparatus according to claim 2, wherein
in a case where the first attribute and the second attribute are different, the first controller or the second controller acquires a control program whose function is restricted as a control program for the first controller or the second controller.

6. The information processing apparatus according to claim 1, wherein
the first controller and the second controller acquire the first control program and the second control program, respectively by referring to management information in which the combination of the first attribute information and the second attribute information and a combination of the first control program and the second control program are associated with each other; and
the management information is updated when a first control program corresponding to a new first attribute of the first controller and a second control program corresponding to a new second attribute of the second controller are registered in the management information.

7. The information processing apparatus according to claim 6, wherein
in a case where the first attribute and the second attribute are different, the first controller or the second controller acquires a control program whose function is restricted as a control program for the first controller or the second controller.

8. The information processing apparatus according to claim 1, wherein
in a case where the first attribute and the second attribute are different, the first controller or the second controller acquires a control program whose function is restricted as a control program for the first controller or the second controller.

9. An information processing system comprising:
a server; and
an information processing apparatus including a first controller that performs control that does not depend on hardware, a second controller that is connected to the first controller through a communication path and performs control that depends on the hardware, and a memory in which first attribute information reflecting a first attribute of the first controller and second attribute information reflecting a second attribute of the second controller are stored,
wherein the first controller acquires a first control program for the first controller that is associated with a combination of the first attribute information and the second attribute information and performs control on a basis of the first control program, and
wherein the second controller acquires a second control program for the second controller that is associated with a combination of the first attribute information and the second attribute information and performs control on a basis of the second control program, wherein
the first controller specifies the first attribute on a basis of the first attribute information;
the second controller specifies the second attribute on a basis of the second attribute information;
the first controller acquires the first control program associated with a combination of the first attribute and the second attribute; and
the second controller acquires the second control program associated with the combination of the first attribute and the second attribute.

10. An information processing method in an information processing apparatus including a first controller that performs control that does not depend on hardware, a second controller that is connected to the first controller through a communication path and performs control that depends on the hardware, and a memory in which first attribute information reflecting a first attribute of the first controller and second attribute information reflecting a second attribute of the second controller are stored, the information processing method comprising causing the first controller to acquire a first control program for the first controller that is associated with a combination of the first attribute information and the second attribute information and to perform control on a basis of the first control program, and causing the second controller to acquire a second control program for the second controller that is associated with a combination of the first attribute information and the second attribute information and to perform control on a basis of the second control program, wherein the information processing method further comprises:

causing the first controller to specify the first attribute on a basis of the first attribute information;

causing the second controller to specify the second attribute on a basis of the second attribute information;

causing the first controller to acquire the first control program associated with a combination of the first attribute and the second attribute; and causing the second controller to acquire the second control program associated with the combination of the first attribute and the second attribute.

\* \* \* \* \*